United States Patent
Zhang et al.

(10) Patent No.: US 7,366,526 B2
(45) Date of Patent: Apr. 29, 2008

(54) METHOD AND APPARATUS FOR PROVIDING IMPROVED BORDER PAGING IN A WIRELESS NETWORK

(75) Inventors: Jingying Zhang, Naperville, IL (US); John C. Nguyen, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/094,986

(22) Filed: Mar. 31, 2005

(65) Prior Publication Data

US 2006/0223550 A1 Oct. 5, 2006

(51) Int. Cl.
 *H04Q 7/20* (2006.01)
(52) U.S. Cl. .................. 455/458; 455/433; 455/432.2; 455/432.3
(58) Field of Classification Search ................ 455/458, 455/432.1–433, 436.4–444; 379/111–134
See application file for complete search history.

(56) References Cited

U.S. PATENT DOCUMENTS

| | | | |
|---|---|---|---|
| 6,421,537 B1 * | 7/2002 | Lamb et al. | 455/433 |
| 6,961,578 B2 * | 11/2005 | Silver et al. | 455/456.3 |
| 2004/0180660 A1 * | 9/2004 | Choi et al. | 455/436 |
| 2005/0265350 A1 * | 12/2005 | Narasimha et al. | 370/395.2 |

* cited by examiner

*Primary Examiner*—Duc M. Nguyen
*Assistant Examiner*—Justin Lee (57) ABSTRACT

This technique is applied in the circumstances where an intersystem page message, e.g. an IS-41 ISPAGE2 message, is received in a first border switching module. The intersystem page message may originate from a second border switching module. In this case, the network determines whether the second border switching module is manufactured by a different network provider than the first border switching module. If so, a routine to address inconsistencies in the location area parameter is implemented so that an efficient paging strategy can be invoked.

23 Claims, 6 Drawing Sheets

```
AUTOPLEX
Cellular            Cellular Network (net)
System

Abutting Switches > 9)
Extended System ID: Switch .. 10)__ ECP .. 11__ System.. 12)____
Data Link Type........ 13)_     Location Area ID(LOCID)1.. 29) 65535  ——— 102
Data Link Unit No...... 14)___  Paging Type1.......... 30) msc
Switch Status......... 15)      LOCID Index 1.......... 31) 0
Multi-Sys. Compatible... 16)_   Location Area ID(LOCID)2.. 32) 65535  ——— 104
DCA Master.............. 17)_   Paging Type2........ 33) msc
IS-41C HO Cap.......... 18)_    LOCID Index 2......... 34) 0
Capable TDMA DTX.......... 19)_ Location Area ID(LOCID)3.. 35) 65535  ——— 106
HO Cap IS41 Data........20)_    Paging Type3....... 36) msc
INFOFWD Capable...........21)_  LOCID Index 3........ 37) 0
Send InterSystemPage...22) n    Location Area ID(LOCID)D.. 38) 65535  ——— 108
Receive-InterSystemPage. 23) n  Paging Type Default.... 39) msc
Perform FYI Page..........24) n LOCID Index Default..... 40) 0
Perform FYI Page Always. 25) n  Support>222 Cells.... 41) n
Send CDMA SCM.............26) n REVA C2A HO.............. 42) n
IS-41 Rev. A for Analog.27) n   Send PosReqFwd........... 43) n
IS-41 3G HO Capable.....28) n   E.212 System Address.. 44)_________
```

METHOD AND APPARATUS FOR PROVIDING IMPROVED BORDER PAGING IN A WIRELESS NETWORK

BACKGROUND OF THE INVENTION

This invention relates to a method and apparatus for providing improved border paging in a wireless network. In one form, the technique is applied in the circumstances where an intersystem page message, e.g. an IS41 ISPAGE2 message, is received in a first border switching module. The intersystem page message may originate from a second border switching module. In such case, the network determines whether the second border switching module is manufactured by a different network provider than the first border switching module. If so, a routine to address inconsistencies in the location area parameter is implemented so that an efficient paging strategy can be invoked.

While the invention is particularly directed to the art of border paging, and will be thus described with specific reference thereto, it will be appreciated that the invention may have usefulness in other fields and applications. For example, the teachings of the invention may be used in other applications where it would be advantageous to address message format incompatibility.

By way of background, wireless communication standards, such as TIA/EIA standards, associate base stations with three parameters-Serving Cell ID, Target Cell ID, and Location Area ID—each two octets in length. However, the standards do not define the format of the three parameters. Instead, the standards allow each service provider and each vendor to implement these parameters in a chosen format. Accordingly, certain incompatibilities need to be addressed in networks where more than one vendor provides network elements.

For example, when a Lucent-based system sends an intersystem page message, such as ISPAGE2, the information in Location Area ID parameter represents a Location Area (LA) value (which is also known as a Sub-MSC Paging Area). Upon receiving this location area (LA) value, a Lucent-based system will use the location area (LA) value to determine a paging strategy to locate an intended mobile phone, for example. However, a Nortel-based system does not use the Location Area value in the Location Area ID parameter. Nortel-based systems include cell/sector information in the Location Area ID parameter. When the cell/sector information does not match with any of Lucent-based provisioned data in the switching module (such as a mobile switching center (MSC)), an MSC page is conducted as a default strategy. As such, more cells than are necessary are paged.

There is a need to provide a solution by introducing a capability for a first system, such as a Lucent-based system to receive cell/sector information in the Location Area ID parameter of ISPAGE2 message from a second system, such as a Nortel-based system, and allow it to recognize this cell/sector information and map the information into a certain "paging area." This would allow the system to perform any one of a variety of different paging strategies, such as location area (LA) paging or location area cluster (LAC) paging. Both of these are more efficient paging strategies than MSC paging, noted above.

The present invention contemplates a new and improved that resolves the above-referenced difficulties and others.

SUMMARY OF THE INVENTION

A method and apparatus for providing improved border paging in a wireless network are provided.

In one aspect of the invention, a method comprises receiving an intersystem page message at a first border switching module provided by a first network provider, the intersystem page message originating at a second border switching module, determining whether the second switching module is provided by a second network provider based on the intersystem page message, retrieving a parameter from a location area identification field of the intersystem page message, accessing an inter-vendor cell form based on the parameter, if the second switching module is provided by the second network parameter, and determining a paging strategy based on at least one selected field of the inter-vendor cell form.

In another aspect of the invention, the intersystem page message is an ISPAGE2 message.

In another aspect of the invention, the intersystem page message is an ISPAGE message.

In another aspect of the invention, the first border switching module is a mobile switching center.

In another aspect of the invention, the second border switching module is a mobile switching center.

In another aspect of the invention, the location area identification field is a LocationAreaID field.

In another aspect of the invention, the paging strategy comprises one of a location area page, a location area cluster page and an MSC page.

In another aspect of the invention, the at least one selected field comprises a paging type field and a LOCID index field.

In another aspect of the invention, a method further comprises determining the paging strategy of an MSC page, if the paging strategy is not determined based on the selected fields.

In another aspect of the invention, a system comprises a first border switching module provided by a first network provider operative to receive an intersystem page message, the intersystem page message originating at a second border switching module, means for determining whether the second switching module is provided by a second network provider based on the intersystem page message, means for retrieving a parameter from a location area identification field of the intersystem page message, means for accessing an inter-vendor cell form based on the parameter, if the second switching module is provided by the second network parameter, and means for determining a paging strategy based on at least one selected field of the inter-vendor cell form.

In another aspect of the invention, the intersystem page message is an ISPAGE2 message.

In another aspect of the invention, the intersystem page message is an ISPAGE message.

In another aspect of the invention, the first border switching module is a mobile switching center.

In another aspect of the invention, the second border switching module is a mobile switching center.

In another aspect of the invention, the location area identification field is a LocationAreaID field.

In another aspect of the invention, the paging strategy comprises one of a location area page, a location area cluster page and an MSC page.

In another aspect of the invention, the at least one selected field comprises a paging type field and a LOCID index field.

In another aspect of the invention, a system further comprises means for determining the paging strategy of an MSC page, if the paging strategy is not determined based on the selected fields.

In another aspect of the invention, a network comprises a first border switching module operative to transmit an intersystem page message, the first border switching module being provided by a first network provider, and a second border switching module operative to receive the intersystem page message, determine whether the second switching module is provided by a second network provider based on the intersystem page message, retrieve a parameter from a location area identification field of the intersystem page message, access an inter-vendor cell form based on the parameter, if the second switching module is provided by the second network parameter, and determine a paging strategy based on at least one selected field of the inter-vendor cell form.

In another aspect of the invention, the intersystem page message is an ISPAGE2 message.

In another aspect of the invention, the intersystem page message is an ISPAGE message.

In another aspect of the invention, the paging strategy comprises one of a location area page, a location area cluster page and an MSC page.

In another aspect of the invention, the at least one selected field comprises a paging type field and a LOCID index field.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

The present invention provides, a border switching module receiving information, the ability to address inconsistencies in data formats, e.g., in the location area ID field of an ISPAGE2 message, where an originating border switching module is manufactured by a different vendor than the receiving border switching module. As in the example noted above, in order to use the cell and sector ID information provided in the Location Area ID parameter of ISPAGE2 message and optimize border paging strategies, the present invention uses an inter-vendor (IVC) all form (RC/V Inter-Vendor Cell form) to recognize, for example, a Nortel-based border cell, rather than attempt to compare the location area (LA) value in RC/V NET form to find a match. The IVC form will, thus, "map" the cell/sector ID into newly created fields identified as "Paging Type" and "LOCID Index." The corresponding subsequent treatments will be provided in call processing, as will be apparent to those of skill in the art.

It should be appreciated that the embodiments of the present invention may also be to cases where an ISPAGE message is used. The differences resulting from such circumstances will be apparent to those skilled in the field. Notably, substantially the same difficulties occur if the ISPAGE message is sent from a border switching module manufactured by a different network provider than the receiving border switching module. As such, embodiments of the present invention can be likewise applied to achieve similar objectives.

Figure 1:
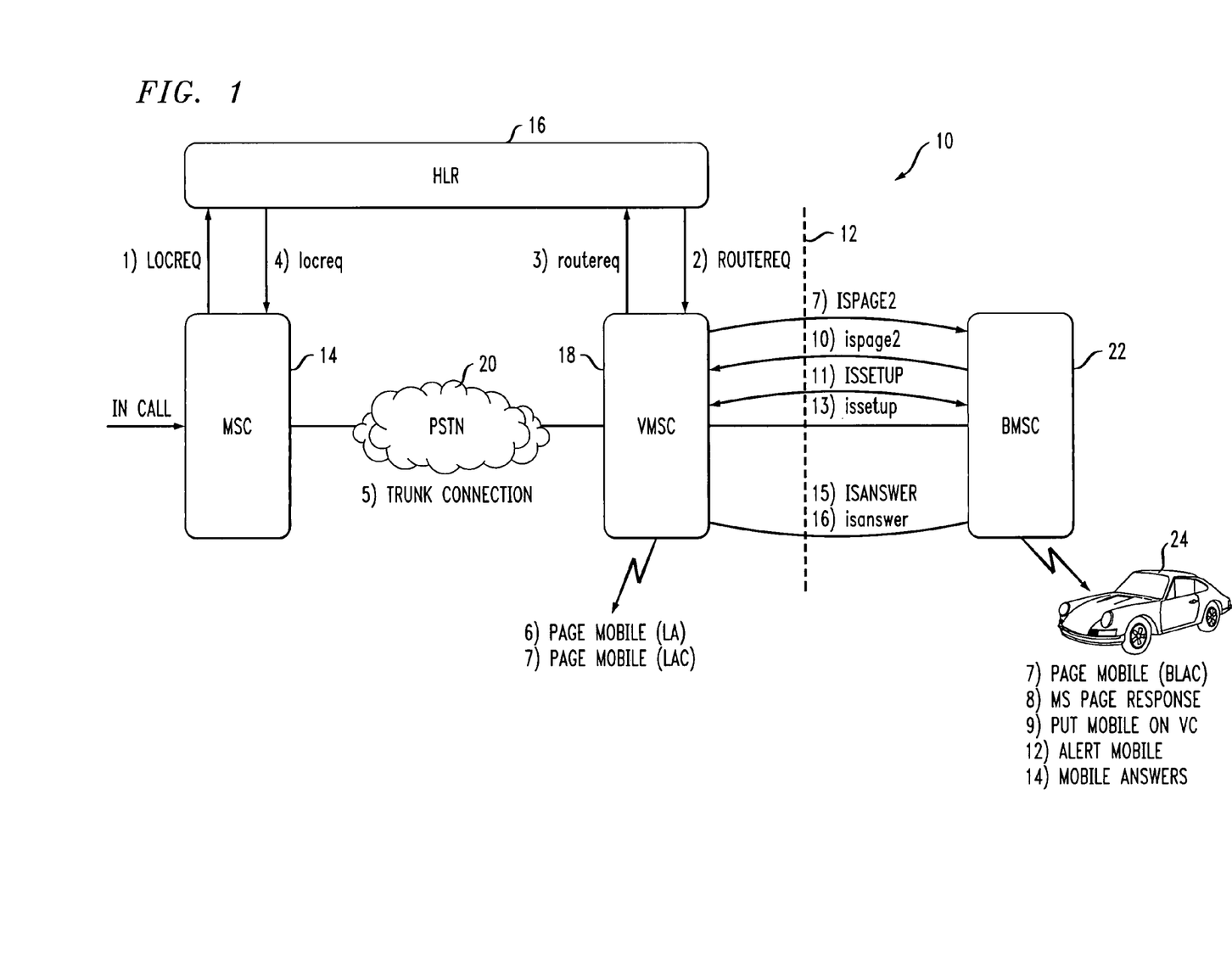
FIG. 1 is a graphic illustration of a network into which the present invention may be implemented.

Referring now to the drawings wherein the showings are for purposes of illustrating the preferred embodiments of the invention only and not for purposes of limiting same, FIG. 1 provides a view of an exemplary network into which the present invention may be implemented. As shown, a network 10, having a border 12 therewithin, includes a switching module 14, a home location register 16, and a visiting switching module or border switching module 18. Also shown is a public switched telephone network (PSTN) 20 accommodating a trunk connection between the switching module 14 and switching module 18. Further illustrated is another border switching module 22 and a graphic illustration of a mobile device 24.

It should be appreciated that the network 10 may take a variety of forms and include a variety of different elements, as those of skill in the art will appreciate. Notably, the present invention is most advantageously applied in a situation where border switching modules communicate through use of an intersystem page message such as an ISPAGE2 message. As noted above and will be described in greater detail below, the invention may also be applied to cases where an ISPAGE message is used. Also, it should be appreciated that, although mobile switching centers are shown as elements 14, 18 and 22, a variety of different switching modules may be implemented. For example, an MTX may be implemented as at least one of these switching modules. Indeed, the invention is advantageously applied in situations where, for example, the border switching module 18 is a switching module that is manufactured by a different vendor than the border switching module 22.

In operation, the switching module 14 receives a call request to a mobile device and begins the process of signaling and setting up the call. For example, the switching module 14 sends a location request to the home location register (HLR) 16, which then sends a routing request to the border switching module 18. The border switching module 18 then sends a reply to the routing request back to the home location register (HLR) 16. The home location register (HLR) 16 subsequently sends a reply to the switching module 14, which then sets up the trunk connection through the public switched telephone network (PSTN) 20 to the switching module 18.

The switching module 18 performs a location area (LA) page and, if the mobile device is not within that location area, performs a location area cluster (LAC) page. In doing so, an intersystem page message, such as an ISPAGE2 message (or an ISPAGE message), is sent from the border switching module 18 to the other border switching module 22. It is at this point that the border switching module 22 performs the steps of the present invention.

Figure 2:
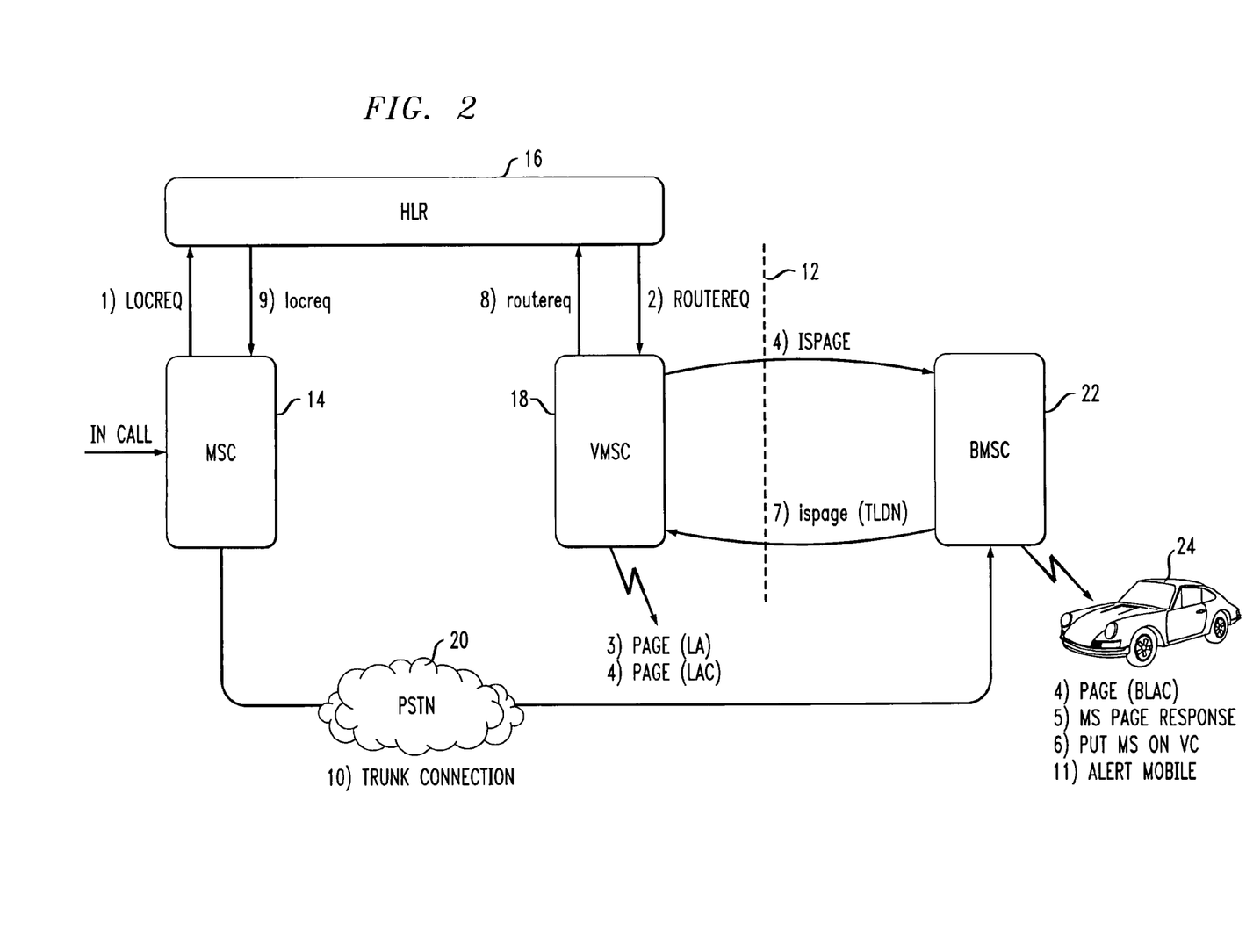
FIG. 2 is a graphic illustration of a network into which the present invention may be implemented.

Referring now to FIG. 2, it should be understood that when an ISPAGE message is sent and received, the network elements may be the same (e.g., elements 14, 16, 18, 20, 22); however, the sequence of messaging and the data path may differ as illustrated in FIG. 2, as those of skill in the art will appreciate. For example, the trunk connection established as a result of the ISPAGE message is between the originating switching module, such as module 14, and the second border switching module, such as module 22 via the public switched telephone network (PSTN) 20.

Referring now to both FIGS. 1 and 2, when a border switching module 22 receives an ISPAGE2 (or ISPAGE) invoke message, it retrieves the information in Location Area ID parameter from the message and compares it with Location Area ID specified in the corresponding ASL entry of a NET form. The NET form is typically used to determine the paging technique to be used. It should be appreciated that this functionality is known in the art. There are only three possible values in the NET form which can be used for the comparison. So long as a match occurs between data retrieved and values in the NET form, traditional methods can be exercised to determine a paging strategy. In this regard, if any one of them matches, the system will follow the paging type and take the location area ID index specified in NET form to continue the paging process. However, if the border switching modules are not provided by the same network provider, inconsistencies may be inherent. Along these lines, as an example, since switching module 18 may place a cell/sector ID in Location Area ID parameter, while switching module 22 expects a location area ID (or Sub-MSC Paging Area number) in this parameter, those two types of information do not match. Thus, absent the present embodiments, default MSC paging will occur, which pages more cells than location area (LA) or location area clustering (LAC) paging strategies.

According to the present invention, however, a modified IVC form will be used to facilitate an approach to address the circumstances where an inconsistency may occur. The selected page type (LA, LAC, or MSC) and location area value or index will be specified in the newly added fields of an inter-vendor (IVC) form.

In this regard, upon receiving an ISPAGE2 (or ISPAGE) invoke message from border switching module 18, the information in the Location Area ID parameter is used to key into the IVC form and locks the specification in the two new fields. The new field, "Paging Type," specifies the paging method to be performed by the Lucent Border MSC. The other new field, "LOCID Index," will specify which location area (LA) or location area cluster (LAC) is to be paged, if the paging type has been specified as "LA" or "LAC" in "Paging Type" field. In this regard, in one form a location area number or a location area cluster number are stored in the field. The "Paging Type" and "Sub-MSC Paging Area—last seen" in the system will be set appropriately based on the values in these two new fields, which will be included in CDMA page message and sent out later.

Upon completion of these steps, the border switching module returns a reply to the border switching module 18 which then proceeds to perform the call set-up between the border switching module 18 and border switching module 22 (as in FIG. 1) or otherwise as shown in FIG. 2. Ultimately, the mobile phone is alerted and answers the call to complete the set-up of the call session.

Figure 3:
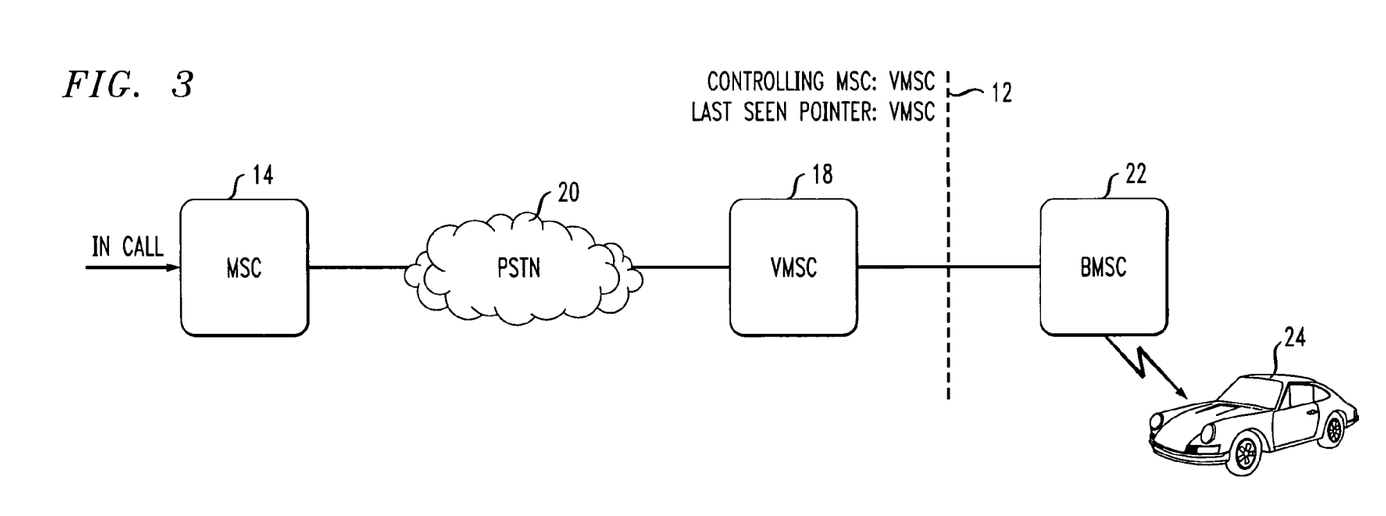
FIG. 3 is another view of a network into which the present invention may be implemented.

FIG. 3 shows a functional equivalent of the network of FIG. 1 once the call session is set-up or established. As shown, switching module 14 communicates through the public switched telephone network (PSTN) 20 to a visiting or border switching module 18. The border switching module 18 then communicates with another border switching module 22 which, in turn, communicates with the mobile device 24.

Figure 4:
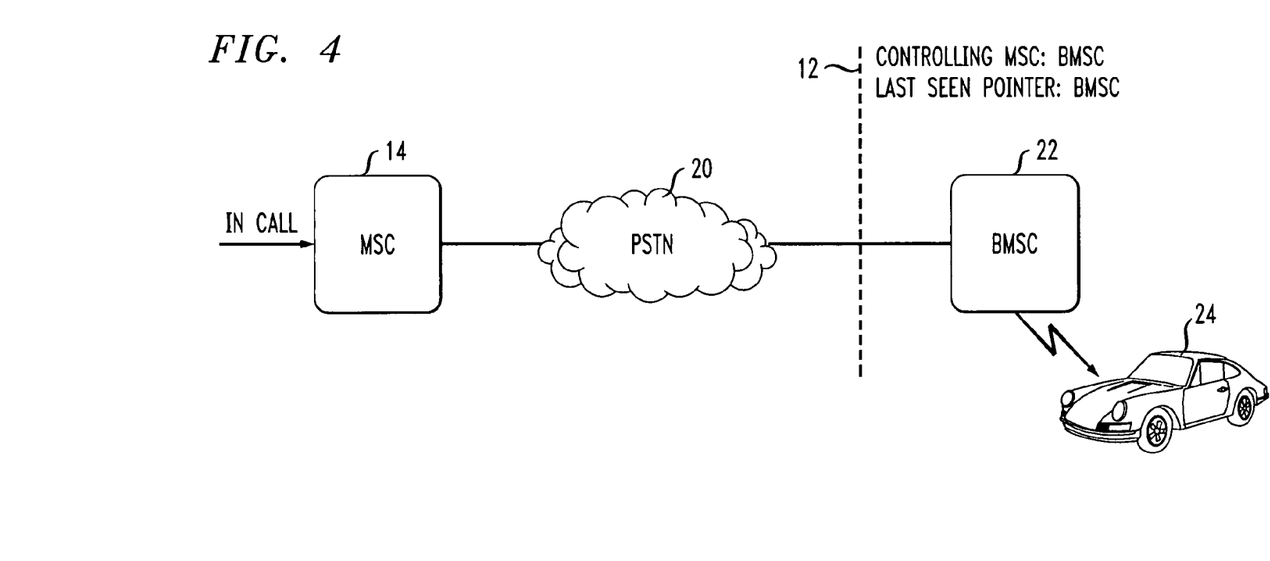
FIG. 4 is another view of a network into which the present invention may be implemented.

Referring now to FIG. 4, it should be further understood that a functional equivalent of the call session where an ISPAGE message is used may appear different than the illustration of FIG. 3. For example, the trunk connection through the public switched telephone network (PSTN) 20 would be made directly between the modules 14 and 22.

Figure 5:
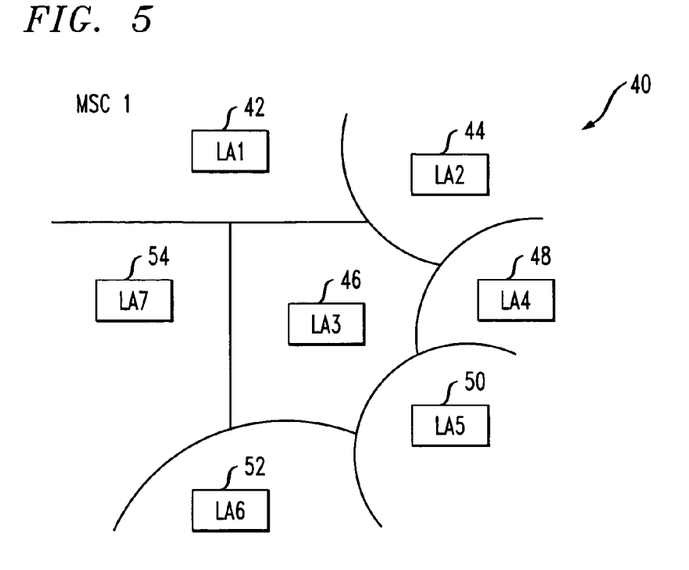
FIG. 5 is a representation of a portion of a network.

As alluded to above, implementation of the invention will ultimately result in a determination of a paging strategy to be used by the switching modules. One of the possible paging strategies is a location area (LA) paging strategy. With reference now to FIG. 5, this paging strategy is explained.

As shown, a portion 40 of a network includes a first location area 42, a second location area 44, a third location area 46, a fourth location area 48, a fifth location area 50, a sixth location area 52 and a seventh location area 54. In location area (LA) paging, a page is limited to a simple location area such as location area 42. Therefore, this technique is most useful where the location of the intended mobile device is highly likely to be in that particular location area.

Figure 6:
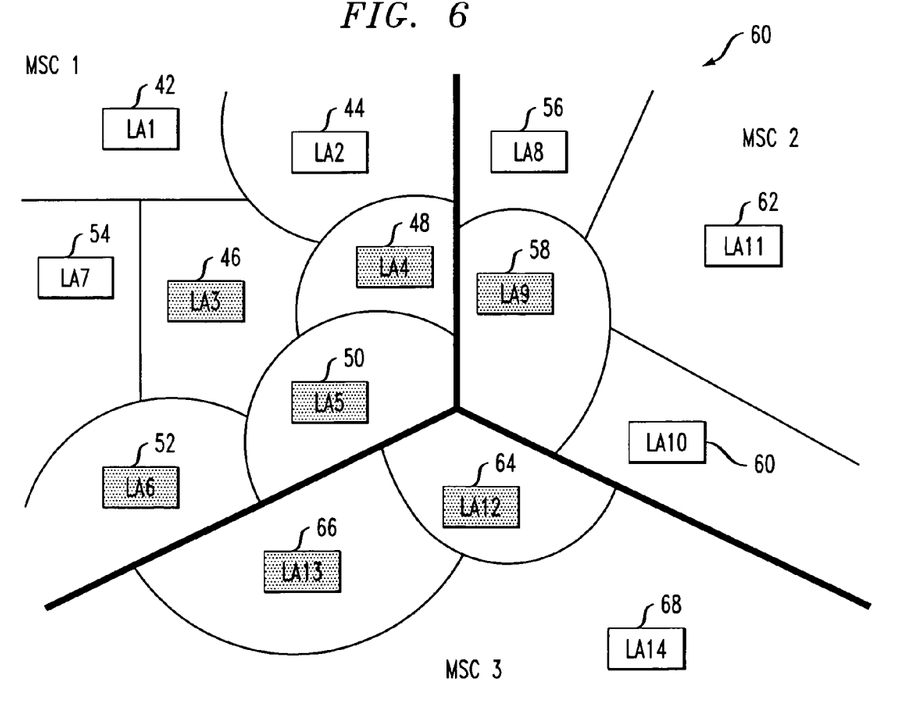
FIG. 6 is another representation of a portion of a network.

Another form of paging strategy is location area cluster (LAC) paging. To illustrate, referring to FIG. 6, a portion 60 of the network is referenced to explain this strategy. In particular, as shown, the portion 60 includes additional location areas 56-68. In location area cluster (LAC) paging, a plurality of location areas are paged, as opposed to a single location area. In this example, location areas 46, 48, 50, 52, 58, 64 and 66 are paged to locate a mobile device within that particular cluster.

A third type of paging, not shown, is an MSC page. In an MSC page, all location areas within a single MSC, or multiple MSCs, are paged in order to locate a mobile.

Figure 7:
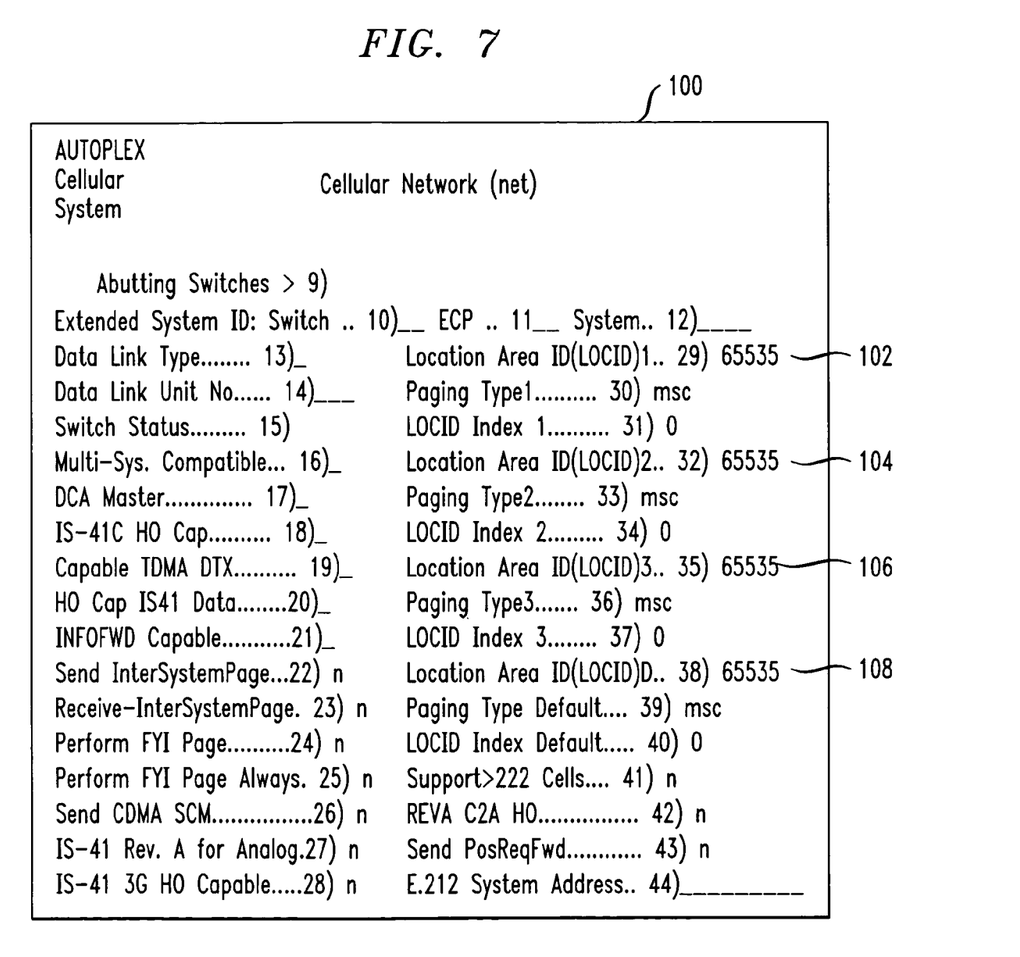
FIG. 7 illustrates a NET form used in networks according to the present invention.

With reference to FIG. 7, a NET form 100 is shown. In typical operation, the location area ID fields 102, 104, 106 and 108 are used in conjunction with the location area ID field data retrieved from the ISPAGE2 message. However, if a different vendor manufactured the border switching module, then the present invention may be implemented.

Figure 8:
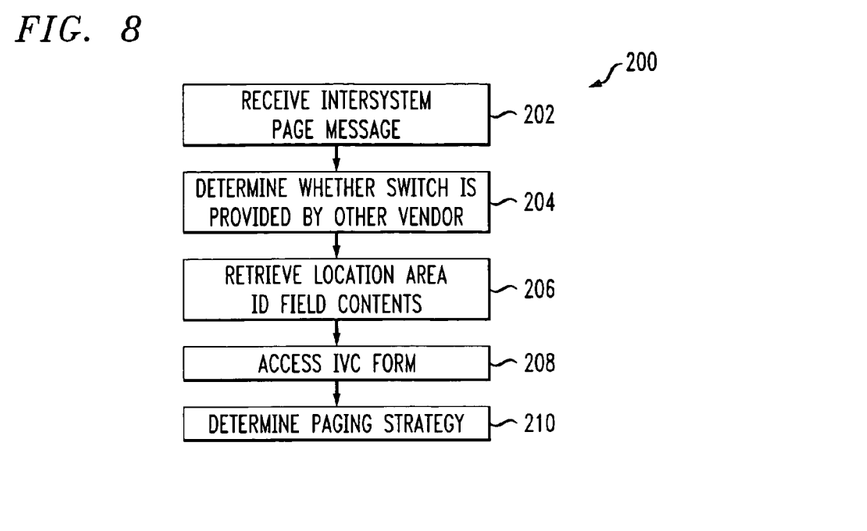
FIG. 8 is a flow chart illustrating a method according to the present invention.

With reference to FIG. 8, a flow chart illustrating a method according to the present invention is shown. In the method 200, an intersystem page message is received at a first border switching module provided by a first network provider (at 202). It should be appreciated that the intersystem page message originates at a second border switching module, such as border switching module 18, which may be manufactured by a different network provider or vendor than the first border switching module. A determination is then made as to whether the intersystem page message originated with a switching module provided by this other vendor (at 204). Next, the location area identification field contents (or parameter) of the message are retrieved by the system for processing (at 206). If the originating switching module, such as switching module 18, was manufactured or provided by another vendor, as determined in step 204, then an inter-vendor cell (IVC) form is accessed based on the contents or parameter of the location area identification field (at 208). A conversion of this data, such as the conversion detailed below, may be accomplished to facilitate use of the IVC form. This conversion will, in one form, be provisioned into the receiving switching module for convenience. However, other techniques may be used. A paging strategy is then determined based on selected fields within the inter-vendor cell form (at 210). Of course, it will be understood that, if it is not determined that the manufacturers of the border switching modules are different, then a NET form such as that shown in FIG. 7 is used. Again, this functionality is known in the art.

In this regard, the paging strategy, as noted above, may be a location area (LA) page, or a location area cluster (LAC) page. If neither of these paging types are selected, a default paging strategy, such as mobile switching center (MSC) paging, is implemented. As described herein, the paging strategy is determined from the paging type field and the LOCID index field of the IVC form.

Figure 9:
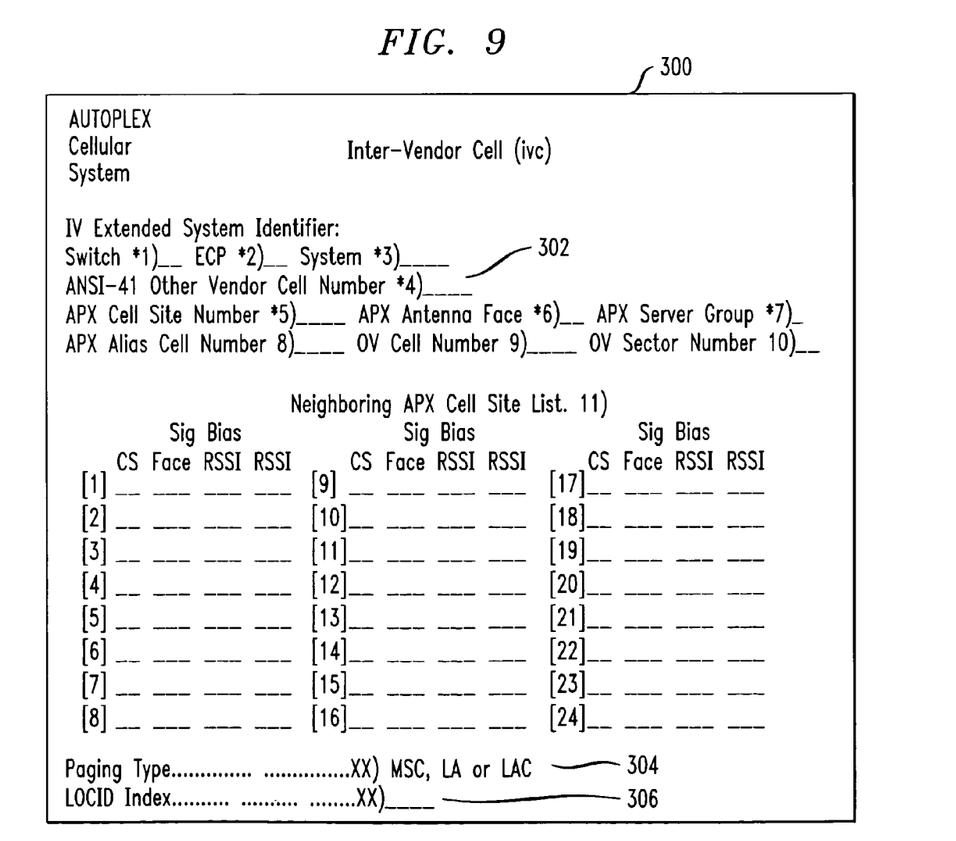
FIG. 9 is a graphic representation of a form used in the implementation of the present invention.

With reference to FIG. 9, an inter-vendor cell (IVC) form 300 is illustrated. As shown, the form 300 includes a field 302 into which the parameter or contents of the location area identification field from the ISPAGE2 (or ISPAGE) message can be stored. This then provides a key to the paging type field 304 and the LOCID index 306, which are used to dictate the paging strategy to be used to locate the intended mobile device. In this regard, for example, if the paging type field 304 has data indicating a location area (LA) page, then the LOCID index 306 will be a location area number. As a further example, if the paging type field 304 has data indicating a location area cluster (LAC) page, then the LOCID index will be a location area cluster number. Further, if the paging type field 304 has data indicating an MSC page, then the LOCID index will be a zero. Of course, other data content may be used to implement the paging strategy (e.g., different ways to identify areas such as cells or sectors instead of location areas).

It should be understood that the location area identification field contents or parameter is retrieved by the border switching module, such as border switching module 22, may be converted to a format indicating the cell and sector number or other location parameters of the originating switching module. In this regard, a variety of techniques could be used depending on the format of the code being transmitted. This may, in turn, depend on the manufacturer or any known standards. In one form, the conversion data is provisioned into the switching module, given that the areas and identifications therefor are typically known at the time of provisioning. The data may also be predetermined and prestored in an accessible table or the like so that simple indexing may be used while processing the messages. The conversion may also be conducted by implementing a suitable software routine upon retrieval of the parameter or contents of the appropriate field. The simple indexing will then lead to provision of and determination of appropriate paging strategies.

This conversion of data, if necessary, will be apparent to those skilled in the field and will depend, as noted above, on the manufacturers involved and the respective data formats. Indeed, there may be cases where a conversion is not even necessary. However, when a conversion is accomplished during, for example, provisioning of a system, knowledge of the received format, the actual locations contemplated by the data, and knowledge of the desired format will assist in the conversion process. Other factors, such as cell face information, may also be a factor in the process.

It should be understood that the present invention may be implemented using a variety of software routines and hardware techniques that vary from application to application. For example, the software which implements the method of the present invention may reside in a centralized location or be distributed throughout the network.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for facilitating paging between border switching modules in a wireless network, the method comprising:
   receiving an intersystem page message at a first border switching module provided by a first network provider, the intersystem page message originating at a second border switching module;
   determining whether the second switching module is provided by a second network provider based on the intersystem page message by comparing possible values between data retrieved in a location area identification field and in NET forms;
   retrieving a parameter from the location area identification field of the intersystem page message;
   accessing an inter-vendor cell form based on the parameter, if the second switching module is provided by the second network parameter, the inter-vendor cell form including a field where the parameters from the identification field may be stored; and,
   determining a paging strategy based on at least one location area value of a selected field of the inter-vendor cell form, where the inter-vendor cell form has been modified in response to the intersystem page message.

2. The method as set forth in claim 1 wherein the intersystem page message is an ISPAGE2 message.

3. The method as set forth in claim 1 wherein the first border switching module is a mobile switching center.

4. The method as set forth in claim 1 wherein the second border switching module is a mobile switching center.

5. The method as set forth in claim 1 wherein the location area identification field is a LocationAreaID field.

6. The method as set forth in claim 1 wherein the paging strategy comprises one of a location area page, a location area cluster page and an MSC page.

7. The method as set forth in claim 1 wherein the at least one selected field comprises a paging type field and a LOCID index field.

8. The method as set forth in claim 1 further comprising determining the paging strategy of an MSC page, if the paging strategy is not determined based on the selected fields.

9. The system as set forth in claim 1 wherein the intersystem page message is an ISPAGE message.

10. A system facilitating paging between border switching modules in a wireless network, the system comprising:
    a first border switching module provided by a first network provider operative to receive an intersystem page message, the intersystem page message originating at a second border switching module;
    means for determining whether the second switching module is provided by a second network provider based on the intersystem page message;

means for retrieving a parameter from a location area identification field of the intersystem page message;

means for comparing possible values in a NET form and data retrieved from the intersystem page message;

means for accessing an inter-vendor cell form based on the parameter which includes a field where the parameter from the location area ID field may be stored, if the second switching module is provided by the second network parameter; and, means for determining a paging strategy based on at least one selected field of the inter-vendor cell form, where the inter-vendor cell form has been modified in response to the intersystem page message.

11. The system as set forth in claim 10 wherein the intersystem page message is an ISPAGE2 message.

12. The system as set forth in claim 10 wherein the first border switching module is a mobile switching center.

13. The system as set forth in claim 10 wherein the second border switching module is a mobile switching center.

14. The system as set forth in claim 10 wherein the location area identification field is a LocationAreaID field.

15. The system as set forth in claim 10 wherein the paging strategy comprises one of a location area page, a location area cluster page and an MSC page.

16. The system as set forth in claim 10 wherein the at least one selected field comprises a paging type field and a LOCID index field.

17. The system as set forth in claim 10 further comprising means for determining the paging strategy of an MSC page, if the paging strategy is not determined based on the selected fields.

18. The system as set forth in claim 10 wherein the intersystem page message is an ISPAGE message.

19. A network comprising:

a first border switching module operative to transmit an intersystem page message, the first border switching module being provided by a first network provider; and, a second border switching module operative to receive the intersystem page message, determine whether the second switching module is provided by a second network provider based on the intersystem cage message, retrieve a parameter from a location area identification field of the intersystem page message by comparing possible values between data retrieved in the location area identification field and in NET forms, access an inter-vendor cell form which has been modified in response to the intersystem page message based on the parameter, the inter-vendor cell form includes a field where the parameters from the location area identification field may be stored if the second switching module is provided by the second network parameter, and determine a paging strategy based on at least one selected field of the inter-vendor cell form.

20. The system as set forth in claim 19 wherein the intersystem page message is an ISPAGE2 message.

21. The system as set forth in claim 19 wherein the paging strategy comprises one of a location area page, a location area cluster page and an MSC page.

22. The system as set forth in claim 19 wherein the at least one selected field comprises a paging type field and a LOCID index field.

23. The system as set forth in claim 19 wherein the intersystem page message is an ISPAGE message.

* * * * *